United States Patent [19]

Aoki et al.

[11] Patent Number: 4,788,256

[45] Date of Patent: Nov. 29, 1988

[54] INSTANTANEOUSLY CURABLE COMPOSITION

[75] Inventors: Kei Aoki, Ikoma; Noriyuki Tsuboniwa, Higashiosaka; Satoshi Urano; Ryuzo Mizuguchi, both of Yawata, all of Japan

[73] Assignee: Nippon Paint Co., Ltd., Osaka, Japan

[21] Appl. No.: 867,022

[22] Filed: May 27, 1986

[30] Foreign Application Priority Data

| May 28, 1985 | [JP] | Japan | 60-117301 |
| May 28, 1985 | [JP] | Japan | 60-117302 |
| May 28, 1985 | [JP] | Japan | 60-117306 |
| May 28, 1985 | [JP] | Japan | 60-117309 |
| May 28, 1985 | [JP] | Japan | 60-117311 |
| May 28, 1985 | [JP] | Japan | 60-117312 |

[51] Int. Cl.$^4$ ............................................. C08F 8/00
[52] U.S. Cl. ............................ 525/326.8; 525/328.2; 525/328.4; 526/312
[58] Field of Search ............ 525/328.2, 328.4, 326.8; 526/312

[56] References Cited

U.S. PATENT DOCUMENTS

| 3,308,075 | 3/1967 | Minsk et al. | 430/451 |
| 3,865,619 | 2/1975 | Pennewiss et al. | 428/522 |
| 4,001,191 | 1/1977 | Reed, Jr. | 526/239 |

FOREIGN PATENT DOCUMENTS 0177122  4/1986  European Pat. Off. .
888269  9/1953  Fed. Rep. of Germany .

Primary Examiner—Joseph L. Schofer
Assistant Examiner—Bernard Lipman
Attorney, Agent, or Firm—Wegner & Bretschneider

[57] ABSTRACT

A curable composition which comprises as the essential components (A) a polymer having a main chain comprising carbon-carbon bonds and an isocyanatocarbonyl group as a pendant to the main chain, the content of the isocyanatocarbonyl groups present in the molecule of the polymer being from 0.1 to 72.2% by weight, and (B) an active hydrogen atom-containing compound which has one or more active hydrogen atoms in the molecule.

37 Claims, No Drawings

INSTANTANEOUSLY CURABLE COMPOSITION

The present invention relates to an instantaneously curable composition. More particularly, it relates to an instantaneously curable composition useful as a coating composition, an adhesive agent, a molding material or the like, and an isocyanate group-containing polymer to be used as an essential component therein.

Throughout the specification, the terms "curable" and "cured" may be taken substantially in the same meanings as the terms "hardnable" and "hardened" or the terms "crosslinkable". Further, the term "lower alkyl" is intended to mean alkyl having 1 to 5 carbon atoms, preferably 1 to 3 carbon atoms, more preferably methyl. The term "halogen" is intended to mean chlorine, bromine, iodine and fluorine, inclusively. Among them, preferred are chlorine and bromine, particularly chlorine.

The term "inert solvent" may be understood to mean any solvent which does not afford any unfavorable influence on achievement of the purpose as aimed at during the reaction or operation in which the solvent is used. In this invention, a highly reactive isocyanatocarbonyl group and/or a compound or polymer having such isocyanatocarbonyl group are created and/or handled so that, in general, any solvent which has an ctive hydrogen atom in the molecule or contain any substantial amount of moisture is not usable. Unless otherwise stated, the inert solvent may be chosen, for instance, from aliphatic hydrocarbons (e.g. pentane, hexane, heptane), aromatic hydrocarbons (e.g. benzene, toluene, xylene), alicyclic hydrocarbons (e.g. cyclohexane, methylcyclohexane, decalin), petrolic hydrocarbons (e.g. petroleum ether, petroleum benzin), halogenated hydrocarbons (e.g. carbon tetrachloride, chloroform, 1,2-dichloroethane), ethers (e.g. diethyl ether, diisopropyl ether, anisole, dioxane, tetrahydrofuran), esters (e.g. methyl acetate, ethyl acetate, butyl acetate), ketones (e.g. acetone, methylethylketone, methylisobutylketone, cyclohexanone, acetophenone, isophorone), acetonitrile, dimethylformamide, dimethylsulfoxide, etc.

As a curable composition, there is known a polyol-curable polyurethane composition which comprises as the essential components a polyisocyanate and an alkyd resin. This polyol-curable polyurethane composition is based on utilization of the room temperature reactivity between the isocyanate groups in the polyisocyanate and the active hydrogen atoms in the alkyd resin. For attainment of prompt curing with such polyol-curable polyurethane composition, a catalyst (e.g. dibutyltin dilaurate) is usually incorporated therein.

In the course of the study seeking a curable composition which can attain curing rapidly, it has been found that a polymer having an isocyanatocarbonyl group —(CO—NCO) as a pendant shows such a high reactivity as more than $10^4$ times that of the corresponding polymer having an isocyanato group (—NCO). It has also been found that the high reactivity of said isocyanatocarbonyl group-containing polymer can be controlled by blocking the isocyanatocarbonyl group therein. Such polymer having a blocked isocyanatocarbonyl group (—CO—NHCO—B wherein B is a blocking group such as the residue of an alkanol excluding a hydrogen atom therefrom) can be readily convered into a non-blocked isocyanatocarbonyl group-containing polymer at a relatively low temperature in comparison with the conversion of the corresponding blocked isocyanato group-containing polymer into a non-blocked isocyanato group-containing polymer. Based on these findings, there has now been provided an instantaneously curable composition comprising a polymer having an isocyanatocarbonyl group and a compound having an active hydrogen as the essential components. The instantaneous curability can be appropriately controlled by blocking a portion or all of the isocyanatocarbonyl groups in the polymer. Said polymer having an isocyanatocarbonyl group in a free or blocked state has been provided by this invention for the first time.

Accordingly, a basic object of the present invention is to provide an instantaneously curable composition, which is useful as a coating composition, an adhesive agent, a molding material, etc. Another object of the invention is to provide a curable composition of which the curing rate is appropriately controlled. A further object of the invention is to provide a polymer having a free or blocked isocyanatocarbonyl group as a pendant, which is used as an essential component in a curable composition. A still further object of the invention is to provide a process for preparing a free or blocked isocyanatocarbonyl group-containing polymer. These and other objects will be apparent to those skilled in the art from the foregoing and subsequent descriptions in this specification.

The instantaneous curable composition of the invention comprises as the essential components (A) a polymer having a main chain comprising carbon-carbon bonds and an isocyanatocarbonyl group as a pendant to the main chain, the content of the isocyanatocarbonyl groups present in the molecule of the polymer being from 0.1 to 72.2% by weight, and (B) an active hydrogen atom-containing compound which has one or more, preferably at least two, active hydrogen atoms in the molecule. The proportion of the isocyanatocarbonyl group-containing polymer (A) and the active hydrogen atom-containing compound (B) may be such that the equivalent ratio of the isocyanatocarbonyl group in the former and the active hydrogen atom in the latter is 1:0.1–100, preferably 1:0.5–5.

The isocyanatocarbonyl group-containing polymer (A) as one of the essential components in the curable composition of the invention may comprise units of an isocyanatocarbonyl group-containing monomer, optionally with units of one or more of other polymerizable monomers. For the use in the composition of the invention, it should have a main chain comprising carbon-carbon bonds and contain isocyanatocarbonyl groups in an amount of 0.1 to 72.2% by weight in the molecule. It is preferred to have a molecular weight of 1,000 to several hundred thousands, especially of 1,000 to 100,000.

The isocyanatocarbonyl group-containing polymer (A) can be manufactured by various procedures. One typical procedure is polymerization of an alkenoyl isocyanate of the formula:

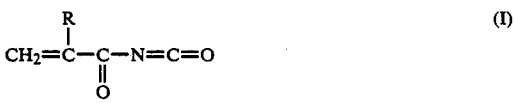

wherein R is a hydrogen atom or a lower alkyl group (e.g. methyl, ethyl, propyl, optionally blocked at the isocyanatocarbonyl group, or an alkenyloxazolinedione hydrohalide of the formula:

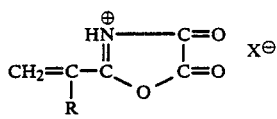 (II)

wherein X is a halogen atom (e.g. chlorine, bromine) and R is as defined above, optionally with one or more of other polymerizable monomers having no active hydrogen atom.

The alkenoyl isocyanate (I) can be produced by reacting an alkenylamide of the formula:

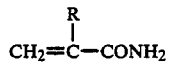 (III)

wherein R is as defined above and an oxalyl halide of the formula:

(COX)$_2$ (IV)

wherein X is as defined above, optionally followed by dehydrohalogenation of the by-product haloalkanoyl isocyanate of the formula:

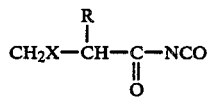 (V)

wherein R and X are each as defined above. More advantageously, the alkenoyl isocyanate (I) can be produced by reacting the alkenylamide (III) with the oxalyl halide (IV) to produce the alkenyloxazolinedione hydrohalide (II) and subjecting the latter to decomposition.

For production of the alkenyloxazolinedione hydrohalide (II), it is preferred that the oxalyl halide (IV) is first charged into a reactor and then the alkenylamide (III) is portionwise added thereto, whereby the reaction proceeds. The molar ratio of the alkenylamide (III) and the oxalyl halide (IV) may be usually about 1:1-3, preferably about 1:1-1.5. The use of an inert solvent as the reaction medium is not essential but is usually preferred. Thus, either one or both of the alkenylamide (III) and the oxalyl halide (IV) may be previously dissolved or suspended therein. The reaction temperature is normally higher than −50° C. and lower than the decomposition temperature of the alkenyloxazolinedione hydrohalide (II), preferably from about 0° to 40° C. From the industrial viewpoint, the temperature around room temperature or under ice cooling is favorable.

For separation of the alkenyloxazolinedione hydrohalide (II) from the reaction mixture, there may be adopted any per se conventional separation procedure such as filtration or distillation under reduced pressure. Addition of seed crystals of the alkenyloxazolinedione hydrohalide (II) to the reaction mixture may be sometimes favorable to accelerate the precipitation of the alkenyloxazolinedione hydrohalide (II). However, separation of the alkenyloxazolinedione hydrohalide (II) from the reaction mixture is not necessarily required.

The alkenyloxazolinedione hydrohalide (II) is then subjected to decomposition under the condition affording the alkenoyl isocyanate (I) predominantly or suppressing by-production of the haloalkanoyl isocyanate (V). One typical example of such condition is to carry out the decomposition under an ordinary pressure (atmospheric or autogenic). Namely, the alkenyloxazolinedione hydrohalide (II) as charged in a reactor is heated under an ordinary pressure until the decomposition proceeds sufficiently. When a reaction medium is used, the heat decomposition can take place at such a low temperature as about 40° C. In the absence of any reaction medium, heating up to the decomposition temperature of the 2-alkenyloxazolinedione hydrohalide (e.g. about 102° to 103° C. in case of 2-isopropenyloxazoline-4,5-dione hydrochloride) is required. As the reaction medium, there may be used an inert solvent. Another example of the condition is to carry out the decomposition in the presence of a hydrogen halide-eliminating agent. Namely, decomposition of the alkenyloxazolinedione hydrohalide (II) in the presence of a hydrogen halide-eliminating agent at a temperature of −50° to 200° C., preferably from 0° to 150° C. under an ordinary or reduced pressure gives predominantly the alkenoyl isocyanate (I). As the hydrogen halide-eliminating agent such as not having an active hydrogen atom or as being reacted with a hydrogen halide not to produe an active hydrogen atom is favorably used. Amines which are the most popular hydrogen halide-eliminating agents are hardly usable in the process of this invention. Specific examples of the preferred hydrogen halide-eliminating agent are metal complex compounds (e.g. (Ph$_3$P)$_2$Ru(CO)$_3$, (Ph$_3$P)$_3$Pt, metal halides (e.g. lithium chloride, titanium tetrachloride, aluminum chloride, cuprous chloride), synthetic zeolite (e.g. molecular sieve, microporous glass), etc. The hydrogen halide-eliminating agent is used normally in an amount of about 0.1 to 100 mol, preferably of about 0.1 to 10 mol to 1 mol of the alkenyloxazolinedione hydrohalide (II). Any reaction medium is not necessarily required to use. When used, an inert solvent may be employed. Another example of the condition is to carry out the decomposition in the presence of a liquid medium having a dielectric constant of not more than 4. Such liquid medium may be constituted with one or more of inert solvents chosen from aliphatic or alicyclic hydrocarbons (e.g., pentane, hexane, heptane, octane, decalin, cyclohexane), aromatic hydrocarbons (e.g. benzene, toluene, xylene, naphthalene), ethers (e.g. propyl ether, butyl ether, dioxane, isopropyl ether), esters, halogenated hydrocarbons (e.g. carbon tetrachloride), etc. A dielectric constant of not more than 4 may be attained by the use of a single solvent or by the use of two or more solvents in combination. The decomposition may be carried out by keeping the alkenyloxazolinedione hydrohalide (II) in a liquid medium of not more than 4 in dielectric constant at a temperature higher than the decomposition temperature of the alkenyloxazolinedione (II), usually from about 40° to 150° C., preferably from about 60° to 120° C., whereby the alkenoyl isocyanate (I) is predominantly produced.

Recovery of the alkenoyl isocyanate (I) from the reaction mixture may be accomplished by a per se conventional separation procedure such as distillation under atmospheric or reduced pressure.

The alkenoyl isocyanate (I) blocked at the isocyanatocarbonyl group may be produced, for instance, by reacting the alkenoyl isocyanate (I) with a blocking agent in an inert solvent at a temperature of −20° to 100° C., preferably at room temperature or under cooling with ice. Examples of the blocking agent are aliphatic alcohols (e.g. methanol, ethanol, chloroethanol, propanol, butanol, pentanol, hexanol, heptanol, octanol, nonanol, 3,3,5-trimethylhexanol, 2-ethylhexanol, decanol), aromatic ring-containing alcohols (e.g. phenylcarbinol, methylphenylcarbinol), ether bond-containing alcohols (e.g. ethylene glycol monobutylether), phenolic compounds (e.g. phenol, cresol, xylenol, nitrophenol, chlorophenol, ethylphenol, t-butylphenol, nonylphenol), monofunctional polyethylenes or polypropylene oxides (e.g. carbowax 550), active methylene compounds (e.g. acetylacetone, diethyl malonate), lactams (e.g. propiolactam, butyrolactam, valerolactam, caprolactam), N-hydroxyimides (e.g. N-hydroxyphthalimide, N-hydroxyglutarimide, N-hydroxysuccinimide), oximes (e.g. methylethylketone oxime, acetone oxime, cyclohexanone oxime), imidazoles (e.g. 1,3-imidiazole), triazoles (e.g. 1,2,3-benzotriazole), amines (e.g. dicyclohexylamine), etc.

In any of the above reactions and the post-treatments, a small amount of a polymerization inhibitor may be incorporated into the reaction system or the reaction mixture for prevention of the unnecessary polymerization on the double bond. Examples of the polymerization inhibitor are hydroquinone, p-methoxyphenol, 2,6-di-t-butyl-4-methylphenol, 4-t-butylcatechol, bisdihydroxybenzylbenzene, 2,2'-methylene-bis(6-t-butyl-3-methylphenol), 4,4'-butylidene-bis(6-t-butyl-3-methylphenol), 4,4'-thiobis(6-t-butyl-3-methylphenol), p-nitrosophenol, diisopropylxanthogenesulfide, N-nitrosophenylhydroxylamine ammonium salt, 1,1-diphenyl-2-picrylhydrazil, 1,3,5-triphenylverdazyl, 2,6-di-t-butyl-alpha-(3,5-di-t-butyl-4-oxo-2,5-cyclohexadien-1-ylidene)-p-trioxy, 2,2,6,6-tetramethyl-4-piperidone-1-oxil, dithiobenzoyl sulfide, p,p'-ditolyl trisulfide, p,p'-ditolyl tetrasulfide, dibenzyl tetrasulfide, tetaethylthiuram disulfide, etc.

The alkenoyl isocyanates (I) are, in general, obtained in a liquid stable at room temperature and therefore can be handled with ease. They are soluble in various organic solvents and can be used in their solution form.

Polymerization of the alkenoyl isocyanate (I), optionally blocked at the isocyanatocarbonyl group, or the alkenoyloxazolinedione (II) optionally with one or more of other polymerizable monomers having no active hydrogen atom may be carried out by a per se conventional procedure for solution polymerization.

As the other polymerizable monomers, there may be exemplified monoolefinic or diolefinic hydrocarbons (e.g. styrene, alpha-methylstyrene, alpha-ethylstyrene, 2-methylpropane-1,2-methylbutene-1,2-methylpentene-1, 2,3-dimethylbutene-1, 2,3-dimethylpentene-1, 2,4-dimethylpentene-1, 2,3,3-trimethylheptene-1, 2,3-dimethylhexene-1, 2,4-dimethylhexene-1, 2,5-dimethylhexene-1, 2-methyl-3-ethylpentene-1, 2,3,3-trimethylpentene-1, 2,3,4-trimethylpentene-1, 2-methyloctene-1, 2,6-dimethylheptene-1, 2,6-dimethyloctene-1, 2,3-dimethyldecene-1, 2-methylnonadecene-1, ethylene, propylene, butylene, amylene, hexylene, butadiene-1,3, isoprene), monoolefinic or diolefinic halogenated hydrocarbons (e.g. alpha-chlorostyrene, alphabromostyrene, 2,5-dichlorostyrene, 2,5-dibromostyrene, 2,6-dichlorostyrene, 3,4-dichlorostyrene, o-, m- or p-fluorostyrene, 2,6-difluorostyrene, 3-fluoro-4-chlorostyrene, 3-chloro-4-fluorostyrene, 2,4,5-trichlorostyrene, dichloromonofluorostyrene, 2-chloropropene, 2-chlorobutene, 2-chloropentene, 2-chlorohexane, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptane, cis- and trans-1,2-dichloroethylene, 1,2-dibromoethylene, 1,2-difluoroethylene, 1,2-diiodoethylene, vinyl chloride, vinylidene chloride, bromoethylene, fluoroethylene, iodoethylene, 1,1-dibromoethylene, 1,1-difluoroethylene, 1,1-diiodoethylene, 1,1,2-trifluoroethylene, chlorobutadiene), carboxylic alkenyl esters (e.g. vinyl acetates, vinyl propionate, vinyl butyrate, vinyl isobutyrate, vinyl valerate, vinyl caproate, vinyl enantate, vinyl benzoate, vinyl p-chlorobenzoate, vinyl o-chlorobenzoate, vinyl p-methoxybenzoate, vinyl p-ethoxybenzoate, isopropenyl acetate, isopropenyl propionate, isopropenyl butyrate, isopropenyl isobutyrate, isopropenyl valerate, isopropenyl caproate, isopropenyl enanteate, isopropenyl benzoate, isopropenyl p-chlorobenzoate, isopropenyl o-chlorobenzoate, isopropenyl o-bromobenzoate, isopropenyl m-chlorobenzoate, isopropenyl alpha-chloroacetate, isopropenyl alpha-bromopropionate, vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate, vinyl alpha-bromovalerate), alkyl alkenoates (e.g. methyl acrylate, ethyl acrylate, n-propyl acrylate, isopropyl acrylate, n-butyl acrylate, sec-butyl acrylate, t-butyl acrylate, isobutyl acrylate, n-hexyl acrylate, 2-ethylhexyl acrylate, 3,5,5-trimethylhexyl acrylate, n-octyl acrylate, lauryl acrylate, tridecyl acrylate, stearyl acrylate, methyl methacrylate, ethyl methacrylate, n-propyl methacrylate, isopropyl methacrylate, n-butyl methacrylate, sec-butyl methacrylate, t-butyl methacrylate, isobutyl methacrylate, amyl methacrylate, n-hexyl methacrylate, 2-ethylhexyl methacrylate, n-octyl methacrylate, lauryl methacrylate, tridecyl methacrylate, stearyl methacrylate, methyl crotonate), alkyl substituted alkenoates (e.g. methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, decyl alpha-chloroacrylate, methyl alpha-cyanoacrylate, ethyl alpha-cyanocrylate, amyl alpha-cyanoacrylate, decyl alpha-cyanoacrylate), allyl or methallyl compounds (e.g. allyl chloride, allyl cyanide, allyl bromide, allyl fluoride, allyl iodide, allyl chloride carbonate, allyl nitrate, allyl thiocyanate, allyl formate, allyl acetae, allyl propionate, allyl valerate, allyl caproate, allyl 3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, methallyl chloride, methallyl cyanide, methallyl chloride carbonate, methallyl nitrate, methallyl thiocyanate, methallyl formate, methallyl acetate, methallyl propionate, methallyl valerate, methallyl caproate, methallyl benzoate, allyl acrylate, allyl crotonate, allyl oleate, methallyl chloroacetate, methallyl trichloroacetate, methallyl chloropropionate, methallyl chlorovalerate, methallyl pyruvate, methallyl acetoacetate, methallyl thioacetate), dialkylaminoalkyl alkanoates (e.g. N,N'-dimethylaminoethyl acrylate, N,N'-dimethylaminoethyl methacrylate), isocyanatoalkyl alkanoates (e.g. isocyanatomethyl acrylate, isocyanatoethyl acrylate, isocyanatomethyl methacrylate, isocyanatoethyl methacrylate), glycidyl acrylate, glycidyl methacrylate, cyclohexyl acrylate, cyclohexyl methacrylate, phenyl acrylate, phenyl methacrylate, benzyl acrylate, benzyl methacrylate, dialkyl unsaturated carboxylates (e.g. dimethyl maleate, diethyl maleate, dimethyl fumarate, diethyl fumarate, dibutyl fumarate), unsaturated nitriles (e.g. acrylonitrile, methacrylonitrile, ethacrylonitrile, 3-octenenitrile, crotonitrile, oleonitrile), etc.

A mixture comprising the alkenoyl isocyanate (I), optionally blocked at the isocyanatocarbonyl group, or the alkenyloxazolinedione (II) optionally with one or more of the other polymerizable monomers having no active hydrogen atom in an inert solvent is subjected to polymerization, for instance, at a temperature of 20° to 200° C., preferably of 60° to 150° C., more preferably of 80° to 110° C. The content of the alkenoyl isocyanate (I), optionally blocked at the isocyanatocarbonyl group, or the alkenyloxazolinedione (II) in the mixture is normally not less than 0.1% by weight. For instance, an inert solvent and, if desired, a portion of the monomeric components are charged in a reactor, and the temperature is retained at 50° to 140° C., preferably 80° to 110° C. Then, solutions of the monomeric components and of the polymerization initiator are dropwise added thereto in about 0.5 to 5 hours, preferably about 1.5 to 3 hours, optionally followed by aging for 0.5 to 2 hours.

Preferably, a polymerization initiator is present in the reaction system. Examples of the polymerization initiator are organic peroxides (e.g. benzoyl peroxide, t-butyl perbenzoate, t-butyl peroxide, cumene hydroperoxide, di-t-butyl peroxide, t-butyl peroctoate), azo compounds (e.g. 2,2'-azobisisobutyronitrile, dimethyl azodiisobutyrate, 2,2'-azobis(2,4-dimethylvaleronitrile), 2,2'-azobis(4-methoxy-2,4-dimethylvaleronitrile), etc. The amount of the polymerization initiator is usually from 0.1 to 10% by weight, preferably from 0.5 to 5% by weight, based on the total weight of the monomeric components. When desired, a chain transfer agent may be also present in the reaction system. As the chain transfer agent, there may be used any conventional one having no active hydrogen atom. Specific examples include alpha-methylstyrene dimer. The amount of the chain transfer agent is usually from 5 to 20% by weight based on the total weight of the monomeric components.

When the alkenyl isocyanate (I) is used as the starting monomer, the above polymerizationn affords the isocyanatocarbonyl group-containing polymer (A) as the direct product, the content of the isocyanatocarbonyl groups being 0.1 to 72.2% by weight and the molecular weight being about 1,000 to 100,000. When the alkenyl isocyanate (I) is blocked at the isocyanatocarbonyl group, the direct product is the blocked isocyanatocarbonyl group-containing polymer (A'), i.e. the polymer which has a blocked isocyanatocarbonyl group as a pendant, the content of the blocked isocyanatocarbonyl groups being from 0.1 to 99.9% by weight, and a molecular weight of about 1,000 to 100,000. This blocked isocyanatocarbonyl group-containing polymer can be readily converted into the isocyanatocarbonyl group-containing polymer (A) by application of a per se conventional blocking group-eliminating procedure to the former, e.g. treatment of the former with heat, light, a catalyst or the like. When the alkenyloxazolinedione hydrohalide (II) is employed as the starting monomer, the direct product is a polymer having an oxazolinedione hydrohalide group

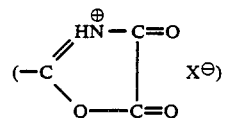

as an pendant, the content of such groups in the molecule being usually from 0.1 to 83.3%, especially from 5 to 83.3%, and having normally a molecular weight of about 1,000 to 100,000, especially of about 1,000 to 50,000. This polymer can be easily converted into the isocyanatocarbonyl group-containing polymer (A) by treatment of the former in substantially the same manner as explained on the conversion of the alkenyloxazolinedione hydrohalide (II) into the alkenoyl isocyanate.

For the use of the isocyanatocarbonyl group-containing polymer (A) thus obtained as an essential component in the composition of the invention, it may be used in the form of the reaction mixture containing the same or in its dilute or concentrated form obtainable by diluting the reaction mixture with an inert solvent or concentrating the reaction mixture to evaporate volatile components therefrom.

In view of the high reactivity of the isocyanatocarbonyl group, however, care should be always taken to exclude water or moisture in any procedure for production of the isocyanatocarbonyl group-containing polymer (A) as stated above and also on storage of the isocyanatocarbonyl group-containing polymer (A).

The other essential component in the curable composition of the invention is the active hydrogen atom-containing compound (B) having one or more, preferably at least two, active hydrogen atoms. Such active hydrogn atom-containing compound (B) may be chosen from a wide scope of compounds having an active hydrogen atom, which may be present in functional groups such as hydroxyl, mercapto, carboxyl, amino, imino and active methylene. Thus, it may be chosen preferably from compounds having two or more of said functional groups in their molecules. Specific examples are resins (e.g. acryl resins, epoxy resins, polyester resins, alkyd resins, polyamide resins, amino resins), polyhydroxy compounds (e.g. ethylene glycol, glycerol, trimethylolpropane, pentaerythritol), alkanolamines (e.g. monoethanolamine, diethanolamine, triethanolamine, tripropanolamine), ammonia, amines (e.g. methylamine, ethylenediamine, hexamethylenediamine), carboxylic acids (e.g. succinic acid, adipic acid, azelaic acid, sebacic acid, phthalic acid, trimellitic acid, fumaric acid, itaconic acid), mercaptans (e.g. ethanedithiol, 2-mercaptoethanol, 2-aminoethanethiol, toluenedithiol), active methylene compounds (e.g. dimethyl malonate, tetracyanopropane, 1,3-cyclohexanedione), etc.

As stated above, the reactivity of the isocyanatocarbonyl group in the polymer (A) is extremely higher (i.e. more than $10^4$ times) than that of an isocyanato group in the corresponding polymer. Therefore, curing of the composition of the invention, i.e. the reaction between the isocyanatocarbonyl group in the polymer (A) and the active hydrogen atom in the compound (B), proceeds instantaneously at room temperature to give a cured product. One typical example of the reaction between an icocyanatocarbonyl group-containing polymer and a triol on curing as presently assumed is schematically shown below. The cured product has a bond of —CO—NH—COO— and shows high elasticity and toughness.

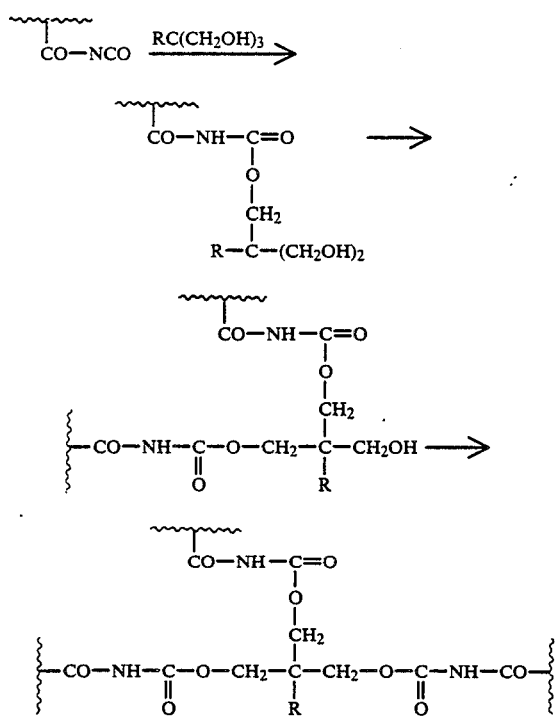

wherein R is as defined above.

When the control of the curing rate of the curable composition of the invention is desired, the isocyanatocarbonyl group-containing polymer (A) therein may be partly or wholly substituted with the blocked isocyanatocarbonyl group-containing polymer (A'). As above stated, the blocked isocyanatocarbonyl group-containing polymer (A') can be produced directly by polymerization of the alkenoyl isocyanate (I) blocked at the isocyanatocarbonyl group. Alternatively, the once-produced isocyanatocarbonyl group-containing polymer (A) may be reacted with a blocking agent in the same manner as explained on the blocking of the alkenoyl isocyanate (I) to give the blocked isocyanatocarbonyl group-containing polymer (A').

The curable composition of the invention may be provided in a single component form or in a two component form depending upon the curing rate. With the blocking degree of the isocyanatocarbonyl groups, the curing rate is varied, and the composition form may be decided thereon. When all the isocyanatocarbonyl groups are free and the curing rate is so high as instantaneous, the curable composition is normally presented in a two component form, i.e. a kit comprising two separate packs, of which one contains the isocyanatocarbonyl group-containing polymer (A) and the other contains the active hydrogen atom-containing compound (B). On the use, they may be mixed together, or one of them is first applied and the other may be applied thereon. When almost all the isocyanatocarbonyl groups are blocked and the curing rate is very small, the curable composition may be presented in a single component form, i.e. a single composition comprising the isocyanatocarbonyl blocked group-containing polymer (A') and the active hydrogen atom-containing compound (B). For convenience on handling, at least one of the isocyanatocarbonyl blocked group-containing polymer (A') and the active hydrogen atom-containing compound (B) may be provided in the form of a solution in an inert solvent. In such case, the concentration of the essential component in the solution may be usually from not less than 0.1% by weight. Under a special situation, the active hydrogen atom-containing compound (B) in a gaseous or vapor form may be contacted onto the isocyanatocarbonyl group-containing polymer (A) for curing. Examples of such active hydrogen atom-containing compound are water, ammonia, ethanolamine, etc.

Depending on the use, the curable composition may optionally comprise conventional additives such as pigments and fillers. These additives may be also incorporated into either one or both of the isocyanatocarbonyl group-containing polymer (A) and the active hydrogen atom-containing compound (B). Any catalyst is usually not required to use, although it may be incorporated if desired.

When the composition is used as a coating composition, a liquid or solution containing the active hydrogen atom-containing compound (B) is usually first applied onto a substrate, and during the liquid or solution is still not completely dried, a liquid or solution containing the isocyanatocarbonyl group-containing polymer (A) is applied thereon in the drying atmosphere, optionally followed by drying at room temperature or under heating. When the composition is used as an adhesive agent, a liquid or solution containing the isocyanatocarbonyl group-containing polymer (A) is applied to a substrate, and a liquid or solution containing the active hydrogen atom-containing compound (B) is applied to another substrate. Then, both of the substrates may be joined together, optionally followed by heating. When the composition is used as a molding material, a liquid or solution containing the isocyanatocarbonyl group-containing polymer (A) and a liquid or solution containing the active hydrogen atom-containing compound (B) are combined together in a mold, followed by curing. Alternatively, said combination may be carried out at a low temperature avoiding curing, and then the resultant mixture is admitted into a mold and brought to room temperature for curing. If necessary, heating may be applied on curing. Paticularly when the content of the bocked isocyanatocarbonyl group-containing polymer is great, heating will be desirable or necessary for curing.

As stated above, the isocyanatocarbonyl group-containing polymer (A) shows a high reactivity attributed to the isocyanatocarbonyl group. The reactivity of the blocked isocyanatocarbonyl group-contaning polymer (A') is somewhat suppressed, but the blocking group can be readily eliminated, for instance, by heating so that the free isocyanatocarbonyl group is recovered and exerts a high reactivity. Therefore, those can be used not only as the essential component in the curable composition of the invention but also as a resinous component in various fields such as coating compositions, adhesive agents, industrial plastics, etc.

Practical and presently preferred embodiments of the invention are illustratively shown in the following examples wherein part(s) and % are by weight, unless otherwise indicated.

REFERENCE EXAMPLE 1

Preparation of 2-vinyloxazoline-4,5-dione hydrochloride

Oxalyl chloride (130 g; 1.02 mol) was charged in a reactor, and a warm solution of acrylamide (71 g; 1.0 mol) in dichloroethane (250 ml) was dropwise added thereto (reaction temperature, 10° to 30° C.). After completion of the dropwise addition, the solvent and excess of the oxalyl chloride were removed by distillation under reduced pressure to obtain 2-vinyloxazoline-4,5-dione hydrochloride (161 g) as a yellow oil. Viscosity, 100,000 cp.

REFERENCE EXAMPLE 2

Preparation of 2-isopropenyloxazoline-4,5-dione hydrochloride

A warm solution of methacrylamide (21.25 g) in dichloroethane (90 ml) was dropwise added in 1 hour to oxalyl chloride (34.5 g) kept at room temperatuure (20° C.) while stirring. The resultant mixture was cooled with water to room temperature. The produced 2-isopropenyloxazoline-4,5-dione hydrochloride (37 g) was collected by filtration under suction, washed with hexane and dried under reduced pressure. Decomposition temperature, 102° to 103° C.

REFERENCE EXAMPLE 3

Preparation of methacryloyl isocyanate

To 2-isopropenyloxazoline-4,5-dione hydrochloride (200 g), o-dichlorobenzene (800 g) was added, and the resultant mixture was heated to 140° C. while stirring for about 40 minutes. After cooling with water, the reaction mixture was distilled under reduced pressure to give methacryloyl isocyanate (70.9 g; b.p., 52° to 53° C./39 mmHg) as a colorless liquid and alpha-methyl-beta-chloropropionyl isocyanate (48.7 g).

REFERENCE EXAMPLE 4

Preparation of acryloyl isocyanate

To 2-vinyloxazoline-4,5-dione hydrochloride (100 g), o-dichlorobenzene (400 g) was added, and the resultant mixture was heated at 110° to 120° C. while stirring for about 30 minutes. After cooling with ice, the reaction mixture was distilled under reduced pressure to give acryloyl isocyanate (8.9 g; b.p., 82° to 83° C./760 mmHg) and betachloropropionyl isocyanate (56.4 g).

REFERENCE EXAMPLE 5

(1)

Preparation of 2-isopropenyloxazoline-4,5-dione hydrochloride

Oxalyl chloride (139.6 g) and o-dichlorobenzene (400 g; dielectric constant, 9.88) were mixed together and cooled to a temperature of 0° to 10° C. Methacrylamide (85.1 g) was portionwise added thereto in 40 minutes, followed by stirring at 35° to 40° C. for 2 hours. A small amount of seed crystals of 2-isopropenyloxazoline-4,5-dione hydrochloride was added thereto, and the resultant mixture was allowed to stand whereby 2-isopropenyloxazoline-4,5-dione hydrochloride was crystallized out.

(2)

Preparation of methacryloyl isocyanate

To the above mixture comprising crystals of 2-isopropenyloxazoline-4,5-dione hydrochloride, hexane (600 g; dielectric constant, 1.88) was added so that the dielectric constant of the solvent mixture was made to 3.45. Stirring was continued at a temperature of 70° to 75° C. for 1.5 hours. Distillation of the reaction mixture gave methacryloyl isocyanate (55.9 g).

REFERENCE EXAMPLE 6

(1)

Preparation of 2-isopropenyloxazoline-4,5-dione hydrochloride

Oxalyl chloride (139.6 g; 1.1 mol) and o-dichlorobenzene (400 g; dielectric constant, 9.88) were mixed together and cooled to a temperature of 0° to 10° C. Methacrylamide (85.1 g; 1.0 mol) was portionwise added thereto in 40 minutes. A small amount of seed crystals of 2-isopropenyloxazoline-4,5-dione hydrochloride was added thereto, and the resultant mixture was allowed to stand whereby 2-isopropenyloxazoline-4,5-dione hydrochloride was crystallized out. Hexane (600 g; dielectric constant, 1.88) was added thereto. Precipitated crystals were collected by filtration to obtain 2-isopropenyloxazoline-4,5-dione hydrochloride in a yield of 98.6%.

(2)

Preparation of methacryloyl isocyanate

2-Isopropenyloxazoline-4,5-dione hydrochloride as obtained above (100 g) was suspended in a mixture of hexane (240 g) and o-dichlorobenzene (160 g), the dielectric constant of the solvent mixture being 3.45. The suspension was heated at a temperature of 70° to 75° C. under reflux for 1.5 hours. Distillation of the reaction mixture gave methacryloyl isocyanate (49 g; yield, 89.9%) and alpha-methyl-beta-chloropropionyl isocyanate (1.4 g; yield, 1.7%).

REFERENCE EXAMPLE 7

Preparation of an active hydrogen atom-containing compound

| Materials | Part(s) |
| --- | --- |
| (a) 2-Hydroxyethyl methacrylate | 7.7 |
| Methyl methacrylate | 18.4 |
| Ethyl acrylate | 18.4 |
| Azobisisobutyronitrile | 0.45 |
| (b) Toluene | 44.5 |
| Butyl acetate | 13.6 |
| (c) Azobisisobutyronitrile | 0.2 |
| Butyl acetate | 8.9 |

Into a reaction vessel, the materiasl under (a) were charged, and heating under reflux was effected for 1 hour to remove water. The materials under (b) were added thereto at 100° C. under nitrogen stream, and the resultant mixture was agaed for 30 minutes. The materials under (c) were dropwise added thereto in 30 minutes, followed by aging at 100° C. for 1.5 hours. The reaction mixture comprising the produced active hydrogen atom-containing compound has the following physical properties: viscosity (determined by Gardner bubble viscometer), C; non-volatile content, 45%; number average molecular weight of resin, 10,720; hydroxyl value of resin (mg number of KOH corresponding to the equivalent of hydroxyl groups in 1 g of the solid component of resin), 75.

EXAMPLE 1

Preparation of an isocyanatocarbonyl group-containing polymer

| Materials | | Part(s) |
|---|---|---|
| (a) | Xylene | 10.0 |
| | Cellosolve acetate | 135.6 |
| (b) | Methacryloyl isocyanate | 9.9 |
| | Methyl methacrylate | 45.1 |
| | Ethyl acrylate | 45.1 |
| | Azobisisobutyronitrile | 1.0 |
| | 1,2-Dichloroethane | 8.9 |
| (c) | Azobisisobutyronitrile | 0.5 |
| | Xylene | 20.0 |

Into a reaction vessel, the materials under (a) were charged, and heating under reflux was effected for 1 hour to remove water. The materials under (b) were dropwise added thereto at 100° C. in 3 hours under nitrogen stream, and the resultant mixture was aged for 30 minutes. The materials under (c) were dropwise added thereto in 30 minutes, followed by aging at 100° C. for 1.5 hours. The reaction mixture comprising the produced isocyanatocarbonyl group-containing polymer has the physical properties as shown in Table 1.

EXAMPLE 2

Preparation of an isocyanatocarbonyl group-containing polymer

| Materials | | Part(s) |
|---|---|---|
| (a) | Toluene | 10.0 |
| | Butyl acetate | 22.0 |
| (b) | Methacryloyl isocyanate | 15.9 |
| | Methyl methacrylate | 42.1 |
| | n-Butyl acrylate | 42.1 |
| | Azobisisobutyronitrile | 1.0 |
| | 1,2-Dichloroethane | 46.0 |
| (c) | Azobisisobutyronitrile | 0.5 |
| | Xylene | 20.0 |

In the same manner as in Example 1 but using the above materials, the operation was carried. The reaction mixture comprising the produced isocyanatocarbonyl group-containing polymer has the physical properties as shown in Table 1.

EXAMPLE 3

Preparation of an isocyanatocarbonyl group-containing polymer

| Materials | | Part(s) |
|---|---|---|
| (a) | Toluene | 26.25 |
| | Butyl acetate | 15.0 |
| (b) | Methacryloyl isocyanate | 5.0 |
| | Styrene | 15.0 |
| | Methyl methacrylate | 15.0 |
| | n-Butyl acrylate | 15.0 |
| | Azobisisobutyronitrile | 1.0 |
| | 1,2-Dichloroethane | 3.75 |
| (c) | Azobisisobutyronitrile | 0.5 |
| | Toluene | 5.0 |

In the same manner as in Example 1 but using the above materials, the operation was carried out. The reaction mixture comprising the produced isocyanatocarbonyl group-containing polymer has the physical properties as shown in Table 1.

EXAMPLE 4

Preparation of a isocyanatocarbonyl group-containing polymer

| Materials | | Part(s) |
|---|---|---|
| (a) | Xylene | 9.1 |
| | Propylene glycol monomethyl ether acetate | 9.1 |
| (b) | Methacryloyl isocyanate | 18.2 |
| | Styrene | 18.2 |
| | Methyl methacrylate | 9.1 |
| | n-Butyl acrylate | 15.2 |
| | t-Butyl peroctoate | 3.0 |
| | 1,2-Dichloroethane | 13.7 |
| (c) | n-Butyl peroctoate | 1.2 |
| | Xylene | 3.0 |

In the same manner as in Example 1 but using the above materials and adopting a polymerization temperature of 140° C., the operation was carried out. The reaction mixture comprising the produced isocyanatocarbonyl group-containing polymer has the physical properties as shown in Table 1.

EXAMPLE 5

Preparation of an isocyanatocarbonyl group-containing polymer

| Materials | | Part(s) |
|---|---|---|
| (a) | Toluene | 46.7 |
| | Butyl acetate | 10.0 |
| (b) | Methacryloyl isocyanate | 30.0 |
| | Methyl methacrylate | 35.0 |
| | n-Butyl acrylate | 20.0 |
| | Styrene | 10.0 |
| | alpha-Methylstyrene dimer | 5.0 |
| | t-Butyl peroctoate | 2.0 |
| (c) | Butyl acetate | 10.0 |
| | t-Butyl peroctoate | 1.0 |

In the same manner as in Example 1 but using the above materials, the operation was carried out. The reaction mixture comprising the produced isocyanatocarbonyl group-containing polymer has the physical properties as shown in Table 1.

EXAMPLE 6

Preparation of an isocyanatocarbonyl group-containing polymer

| Materials | | Part(s) |
|---|---|---|
| (a) | Toluene | 46.7 |
| | Butyl acetate | 10.0 |
| (b) | Methacryloyl isocyanate | 20.0 |
| | Methyl methacrylate | 40.0 |
| | n-Butyl acrylate | 25.0 |
| | Styrene | 10.0 |
| | alpha-Methylstyrene dimer | 5.0 |
| | t-Butyl peroctoate | 2.0 |
| (c) | Butyl acetate | 10.0 |
| | t-Butyl peroctoate | 1.0 |

In the same manner as in Example 1 but using the above materials, the operation was carried out. The reaction mixture comprising the produced isocyanatocarbonyl group-containing polymer has the physical properties as shown in Table 1.

EXAMPLE 7

Preparation of an isocyanatocarbonyl group-containing polymer

| Materials | Part(s) |
|---|---|
| (a) Butyl acetate | 5.6 |
| (b) Methacryloyl isocyanate | 20.0 |
| Azobisisobutyronitrile | 0.2 |
| (c) Butyl acetate | 3.0 |
| Azobisisobutyronitrile | 0.1 |

In the same manner as in Example 1 but using the above materials, adopting a polymerization temperature of 110° C. and taking 2 hours for dropwise addition of the materials under (b), the operation was carried out. The reaction mixture comprising the produced isocyanatocarbonyl group-containing polymer has the physical properties as shown in Table 1.

TABLE 1

| Physical property | Example 1 | 2 | 3 | 4 | 5 | 6 | 7 |
|---|---|---|---|---|---|---|---|
| Viscosity (determined by Gardner bubble viscometer, 25° C.) | R | V>W | K | $Z_3$ | C-D | B | T |
| Non-volatile content (%, 110° C. × 30 min.) | 35.7 | 47.5 | 47.8 | 60.6 | 39.5 | 40.0 | 49.1 |
| Resin, number average molecular weight (determined by GPC) | 10100 | 7410 | 8110 | 3680 | 4930 | 6760 | 6140 |
| —CONCO content in resin (%) | 2.20 | 5.01 | 3.15 | 11.48 | 11.35 | 7.57 | 44.14 |

EXAMPLE 8

Into a flask, the isocyanatocarbonyl group-containing polymer as obtained in Example 3 (4 parts) and chloroform (6 parts) were charged, and a mixture of trimethylolethane. (0.076 part) and tetrahydroquinone (4 parts) was dropwise added thereto in 30 seconds while stirring at room temperature in nitrogen stream, whereby the contents in the flask was hardened immediately.

EXAMPLE 9

In the same manner as in Example 8 but replacing the mixture of trimethylolethane and tetrahydroquinone by a mixture of diethanolamine (0.06 part) and tetrahydroquinone (4 parts), that of 1,6-hexanediol (0.10 part) and tetrahydroquinone (4 parts), that of azelaic acid (0.16 part) and tetrahydroquinone (4 parts), that of N-methyl-1,3-propanediamine (0.05 part) and tetrahydroquinone (4 parts) or that of the active hydrogen atom-containing compound as obtained in Reference Example 7 (1.8 parts) and tetrahydroquione (4 parts), mixing was conducted, whereby the contents in the flask was hardened immediately.

EXAMPLE 10

(1)

Preparation of a blocked isocyanatocarbonyl group-containing polymer

Into a reaction vessel, dioxane (20.0 parts) was charged and heated to 80° C. A mixture of dioxane (38.3 parts), 2,6-di-t-butyl-p-cresol-blocked methacryloyl isocyanate (8.5 parts), styrene (9.0 parts) and 2,2'-azobis(2,4-dimethylvaleronitrile) (0.35 part) was dropwise added thereto at 80° C. in 3 hours to give the reaction mixture comprising a copolymer of 2,6-di-t-butyl-p-cresol-blocked methacryloyl isocyanate and styrene. Number average molecular weight of resin, 9,900. Non-volatile content, 30%.

(2)

Preparation of an isocyanatocarbonyl group-containing polymer

The reaction mixture comprising the 2,6-di-t-butyl-p-cresol-blocked methacryloyl isocyanate/styrene copolymer as above obtained was heated at 110° C. with an infrared heating cell, whereby the blocking group was eliminated and a methacryloyl isocyanate/styrene copolymer was produced.

The thus produced methacryloyl isocyanate/styrene copolymer was treated with a mixture of trimethylolethane and tetrahydroquinone in the same manner as in Example 8, whereby instantaneous curing was observed.

EXAMPLE 11

(1)

Preparation of a blocked isocyanatocarbonyl group-containing polymer

Into a reaction vessel, dioxane (10.0 parts) and 2,6-di-t-butyl-p-cresol-blocked acryloyl isocyanate (6.0 parts) were charged and heated. A mixture of dioxane (2.0 parts) and 2,2'-azobis(2,4-dimethylvaleronitrile) (0.12 part) was dropwise added thereto to give the reaction mixture comprising a homopolymer of 2,6-di-t-butyl-p-cresol-blocked acryloyl isocyanate. Number average molecular weight of resin, 6,400. Non-volatile content, 33%.

(2)

Preparation of an isocyanatocarbonyl group-containing polymer

The reaction mixture comprising the 2,6-di-t-butyl-p-cresol-blocked acryloyl isocyanate homopolymer as above obtained was heated, whereby the blocking group was eliminated and an acryloyl isocyanate homopolymer was produced.

The thus produced acryloyl isocyanate homopolymer was treated with a mixture of trimethylolethane and tetrahydroquinone in the same manner as in Example 8, whereby instantaneous curing was observed.

EXAMPLE 12

Preparation of an isocyanatocarbonyl group-containing polymer

| Materials | Part(s) |
|---|---|
| (a) Toluene | 70 |
| Butyl acetate | 20 |
| (b) Methacrylol isocyanate | 10 |
| Isocyanatoethyl methacrylate | 20 |
| Methyl methacrylate | 35 |
| n-Butyl acrylate | 20 |
| alpha-Methylstyrene dimer | 15 |
| Azobisisobutyronitrile | 2 |
| (c) Butyl acetate | 10 |
| Azobisisobutyronitrile | 1 |

Into a reaction vessel, the materials under (a) were charged and heated to 90° C. The materials under (b) were dropwise added thereto in 2 hours under nitrogen stream, and the resultant mixture was aged for 30 minutes. The materials under (c) were dropwise added thereto in 30 minutes, followed by aging for 2 hours. The reaction mixture comprising the produced isocyanatocarbonyl group-containing polymer has the physical properties as shown in Table 2.

EXAMPLE 13

| Materials | Part(s) |
|---|---|
| (a) Toluene | 70 |
| Butyl acetate | 20 |
| (b) Methacrylol isocyanate | 10 |
| Isocyanatoethyl methacrylate | 20 |
| Methyl methacrylate | 35 |
| n-Butyl acrylate | 20 |
| alpha-Methylstyrene dimer | 15 |
| t-Butyl peroctoate | 4 |
| (c) Butyl acetate | 10 |
| t-Butyl peroctoate | 1 |

In the same manner as in Example 12 but using the above materials, the operation was carried out. The reaction mixture comprising the produced isocyanatocarbonyl group-containing polymer has the physical properties as shown in Table 2.

EXAMPLE 14

| Materials | Part(s) |
|---|---|
| (a) Toluene | 46.7 |
| (b) Methacrylol isocyanate | 5 |
| Isocyanatoethyl methacrylate | 25 |
| Methyl methacrylate | 35 |
| n-Butyl acrylate | 20 |
| alpha-Methylstyrene dimer | 15 |
| Azobisisobutyronitrile | 2 |
| (c) Butyl acetate | 10 |
| Azobisisobutyronitrile | 1 |

In the same manner as in Example 12 but using the above materials, the operation was carried out. The reaction mixture comprising the produced isocyanatocarbonyl group-containing polymer has the physical properties as shown in Table 2.

EXAMPLE 15

| Materials | Part(s) |
|---|---|
| (a) Toluene | 70 |
| Butyl acetate | 10 |
| (b) Methacrylol isocyanate | 20 |
| Isocyanatoethyl methacrylate | 10 |
| Methyl methacrylate | 35 |
| n-Butyl acrylate | 20 |
| alpha-Methylstyrene dimer | 15 |
| Azobisisobutyronitrile | 2 |
| (c) Butyl acetate | 20 |
| Azobisisobutyronitrile | 1 |

In the same manner as in Example 12 but using the above materials, the operation was carried out. The reaction mixture comprising the produced isocyanatocarbonyl group-containing polymer has the physical properties as shown in Table 2.

EXAMPLE 16

| Materials | Part(s) |
|---|---|
| (a) Toluene | 46.7 |
| (b) Methacrylol isocyanate | 10 |
| Isocyanatoethyl methacrylate | 20 |
| Methyl methacrylate | 35 |
| n-Butyl acrylate | 20 |
| alpha-Methylstyrene dimer | 15 |
| 2,2'-Azobis(2,4-dimethyl-valeronitrile) | 2 |
| (c) Butyl acetate | 20 |
| 2,2'-Azobis(2,4-dimethyl-valeronitrile) | 1 |

In the same manner as in Example 12 but using the above materials, the operation was carried out. The reaction mixture comprising the produced isocyanatocarbonyl group-containing polymer has the physical properties as shown in Table 2.

TABLE 2

| Physical property | Example 12 | 13 | 14 | 15 | 16 |
|---|---|---|---|---|---|
| Viscosity (determined by Gardner bubble viscometer, 25° C.) | G-H | $A_4$-$A_5$ | F | $Z_6=$ | B |
| Non-volatile content (%, 110° C. × 30 min.) | 36.5 | 33.5 | 50.9 | 45.4 | 42.0 |
| Resin, number average molecular weight (determined by GPC) | 4190 | 3890 | — | 3860 | 5850 |
| —CONCO content in resin (%) | 3.2 | 3.2 | 1.9 | 6.4 | 3.8 |
| —NCO content in resin (%) | 2.7 | 2.7 | 4.1 | 1.4 | 3.3 |

To each of the reaction mixtures comprising the isocyanatocarbonyl group-containing polymer as obtained in Examples 12 and 15, dibutyl tin dilaurate was added in an amount of 0.2% (in terms of the non-volatile component in the reaction mixture). The resulting mixture was applied onto a tin plate by the use of a bar coater to make a coating film having a thickness of 20 microns, followed by allowing to stand at room temperature. The state of the coating film with the time after the application was observed. The results are shown in Table 3 wherein the rubbing test was conducted by rubbing the coated tin plate with xylene-immersed cloth after 20 hours from the application.

TABLE 3

| Example | Time limit leaving no fingerprint with gentle pressing | Time limit leaving no fingerprint with strong pressing | Rubbing test |
| --- | --- | --- | --- |
| 12 | 3 minutes | 5 minutes | No coating film dissolved |
| 15 | Within 1 minutes | Within 1 minute | No coating film dissolved |

From the above results, it is understood that the isocyanatocarbonyl group-containing polymers as obtained in Examples 12 and 15 can afford coating films excellent in initial drying property and curability.

EXAMPLE 17

Preparation of an oxazolinedione hydrohalide group-containing polymer

To 2-isopropenyloxazoline-4,5-dione hydrochloride (20 g), 2,2′-azobis (4-methoxy-2,4-dimethyl)valeronitrile (600 mg) and ethyl acetate (46 g) were added, and the resulting mixture was heated at 38° to 39° C. for 7 hours, whereby a homopolymer of 2-isopropenyloxazoline-4,5-dione hydrochloride was produced. Viscosity, A-3 (determined by Gardner bubble viscometer). Non-volatile content, 30%. Mw, 1800 (determined by gel permeation chromatography).

EXAMPLE 18

Preparation of an oxazolinedione hydrohalide group-containing polymer

To a mixture of 2-isopropenyloxazoline-4,5-dione hydrochloride (15 g), methyl methacrylate (20 g), n-butyl acrylate (15 g) and ethyl acetate (75 g), 2,2′-azobis(4-methoxy-2,4-dimethyl)valeronitrile (2.5 g) was added, and the resulting mixture was heated at 38° to 39° C. for 14 hours, whereby a copolymer of 2-isopropenyloxazoline-4,5-dione hydrochloride with methyl methacrylate and n-butyl acrylate was produced. Viscosity, A-2 (determined by Gardner bubble viscometer). Mw, 4500 (determined by gel permeation chromatography).

EXAMPLE 19

Preparation of an oxazolinedione hydrohalide group-containing polymer

To a mixture of 2-isopropenyloxazoline-4,5-dione hydrochloride (15 g), methyl methacrylate (20 g), n-butyl acrylate (15 g), styrene (14 g) and ethyl acetate (84 g), acetylcyclohexylsulfonyl peroxide (a polymerization initiator "Perhexa ACS" manufactured by Nippon Oil and Fat) (225 mg) was added, and the resulting mixture was heated at 38° to 39° C. for 14 hours, whereby a copolymer of 2-isopropenyloxazoline-4,5-dione hydrochloride with methyl methacrylate, n-butyl acrylate and styrene was produced. Viscosity, A-3 (determined by Gardner bubble viscometer). Mw, 2500 (determined by gel permeation chromatography).

EXAMPLE 20

(1)

Preparation of an isocyanatocarbonyl group-containing polymer

A mixture of 2-isopropenyloxazoline-4,5-dione hydrochloride (15 g), methyl methacrylate (20 g), n-butyl acrylate (15 g), 2,2′-azobis(2,4-dimethylvaleronitrile) (1.25 g) and ethyl acetate (25 g) was dropwise added to toluene (50 g) heated at 100° C. in 90 minutes while stirring. Stirring was further continued for 5 hours, whereby a copolymer of methacryloyl isocyanate with methyl methacrylate and n-butyl acrylate was produced. Viscosity, C-D (determined by Gardner bubble viscometer). Non-volatile content, 40%. Mw, 7100 (determined by gel permeation chromatography).

(2)

Preparation of a blocked isocyanatocarbonyl group-containing polymer

To the reaction mixture comprising the methacryloyl isocyanate/methyl methacrylate/n-butyl acrylate copolymer as obtained above, t-butanol (6.3 g) was added to produce a t-butanol-blocked methacryloyl isocyanate/methyl methacrylate/n-butyl acrylate copolymer.

EXAMPLE 21

Preparation of an isocyanatocarbonyl group-containing polymer

An ethyl acetate solution (non-volatile content, 30%) containing a homopolymer of 2-isopropenyloxazoline-4,5-dione hydrochloride (Mn, 1800) was heated at 70° to 80° C. while stirring for 1 hour to obtain a homopolymer of methacryloyl isocyanate. Viscosity: A-B (determined by Gardner bubble viscometer).

EXAMPLE 22

Preparation of a blocked isocyanatocarbonyl group-containing polymer

1-Methoxy-2-propanol-blocked methacryloyl isocyanate (10.05 g), methyl methacrylate (9.99 g), ethyl acrylate (9.96 g) and 2,2′-azobis(2,4-dimethylvaleronitrile) (400 mg) were dissolved in dichloroethane (90 g), and the resultant solution was dropwise added to toluene (20 g) heated at 100° C. in 3 hours. Then, 2,2′-azobis(2,4-dimethylvaleronitrile) (200 mg) and toluene (2 g) were added thereto, followed by aging for 1.5 hours to give a copolymer of 1-methoxy-2-propanol-blocked methacryloyl isocyanate with methyl methacrylate and ethyl acrylate. Non-volatile content, 17.5%. Mn, 6500.

EXAMPLE 23

Preparation of a blocked isocyanatocarbonyl group-containing polymer

2-Methyl-2-propanol-blocked methacryloyl isocyanate (6.70 g) was dissolved in a mixture of methyl methacrylate (6.66 g), ethyl acrylate (6.64 g) and dioxane (35 g) at 110° C. A solution of 2,2′-azobis(2,4-dimethylvaleronitrile) (400 mg) in butyl acetate (25 g) was dropwise added thereto in 2.5 hours, followed by aging for 1.5 hours to give a copolymer of 2-methyl-2-propanol-blocked methacryloyl isocyanate with methyl methacrylate ad ethyl acrylate. Non-volatile content, 22%. Mn. 6800.

EXAMPLE 24

(1)

Preparation of an isocyanatocarbonyl group-containing polymer

A mixture of methacryloyl isocyanate (4 g), methyl methacrylate (4 g), styrene (1 g), butyl acrylate (4 g), 2,2′-azobis(2,4-dimethylvaleronitrile) (390 mg) and dichloroethane (7.5 g) was dropwise added to toluene (8 g) heated at 100° C. in 3 hours. Then, 2,2'-azobis(2,4-dimethylvaleronitrile) (65 mg) and toluene (6 g) were added thereto, followed by aging for 1.0 hour to give a copolymer of methacryloyl isocyanate with methyl methacrylate, stryene and butyl acrylate. Non-volatile content, 43%.

(2)

Preparation of a blocked isocyanatocarbonyl group-containing polymer

The reaction mixture comprising the methacryloyl isocyanate/methyl methacrylate/styrene/butyl acrylate copolymer as above obtained was cooled to 10° C., and a solution of methylethylketoxime (3.2 g) in toluene (22 g) was dropwise added thereto, whereby a copolymer of methylethylketoxime-blocked methacryloyl isocyanate with methyl methacrylate, styrene and butyl acrylate was produced. Mn, 6500.

EXAMPLE 25

(1)

Preparation of an isocyanatocarbonyl group-containing polymer

A mixture of methacryloyl isocyanate (4 g), styrene (9 g), 2,2'-azobis(2,4-dimethylvaleronitrile) (390 mg) and dichloroethane (0.7 g) was dropwise added to a mixture of toluene (3 g) and butyl acetate (8.3 g) heated at 110° C. in 2.5 hours. Then, 2,2'-azobis(2,4-dimethylvaleronitrile) (65 mg) and butyl acetate (1 g) were added thereto, followed by aging for 1.0 hour to give a copolymer of methacryloyl isocyanate with styrene. Non-volatile content, 45%.

(2)

Preparation of a blocked isocyanatocarbonyl group-containing polymer

The reaction mixture comprising the methacryloyl isocyanate/styrene copolymer as above obtained was cooled to 25° C., and a solution of 2,6-di-t-butyl-p-cresol (15.8 g) in butyl acetate (28 g) was dropwise added thereto. Dibutyltin diacetate (250 mg) was added to the resulting mixture, which was then heated at 60° C. for 5 hours to produce a copolymer of 2,6-d-t-butyl-p-cresol-blocked methacryloyl isocyanate with styrene. Mn, 9900.

EXAMPLE 26

Preparation of a blocked isocyanatocarbonyl group-containing polymer

1-Methoxy-2-propanol-blocked methacryloyl isocyanate (2.1 g) was dissolved in dichloroethane (2.4 ) at 85° C., and a solution of 2,2'-azobis(2,4-dimethylvaleronitrile) (63 mg) in dichloroethane (3.2 g) was dropwise added thereto, followed by aging for 2.0 hours to give a homopolymer of 1-methoxy-2-propanol-blocked methacryloyl isocyanate. Non-volatile content, 22%. Mn, 2100.

EXAMPLE 27

(1)

Preparation of an isocyanatocarbonyl group-containing polymer

Methacryloyl isocyanate (8.9 g), butyl acetate (9 g), dichloroethane (7 g) and 2,2'-azobis(2,4-dimethylvaleronitrile) (166 mg) were mixed together, and the resultant mixture was dropwise added to butyl acetate (4 g) heated at 110° C. in 1 hour, followed by aging for 3.0 hours to give a homopolymer of methacryloyl isocyanate. Non-volatile content, 26%.

(2)

Preparation of a blocked isocyanatocarbonyl group-containing polymer

The reaction mixture comprising the methacryloyl isocyanate homopolymer as obtained above was allowed to cool at room temperature, a solution of methylethylketoxime (4.4 g) in butyl acetate (8 g) was dropwise added thereto, and the reaction was continued until the absorption attributed to an isocyanato group disappeared in the infrared absorption spectrum, whereby a homopolymer of methylethylketoxime-blocked methacryloyl isocyanate was obtained. Mn, 1600.

What is claimed is:

1. A curable composition comprising (A) an isocyanatocarbonyl group-containing polymer having a carbon-carbon backbone and isocyanatocarbonyl groups pendent therefrom of the formula

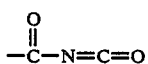

and a molecular weight between 1,000 and 100,000 and (B) an active hydrogen atom-containing compound.

2. The curable composition of claim 1 wherein the equivalent ratio of isocyanatocarbonyl groups in the polymer to active hydrogen atoms in the compound is between 1:0.1 and 1:100.

3. The curable composition of claim 1 wherein the equivalent ratio of isocyanatocarbonyl groups in the polymer to active hydrogen atoms in the compound is between 1:0.5 and 1:5.

4. The curable composition of claim 1 in a single component form.

5. The curable composition of claim 1 in a two component form.

6. The curable composition of claim 1 wherein the polymer has a molecular weight between 3,000 and 100,000.

7. The curable composition of claim 1 wherein the polymer further has units derived from a polymerizable monomer having no active hydrogen atom.

8. The curable composition of claim 1 wherein the polymer is obtained by polymerizing (a) an alkenoyl isocyanate of the formula

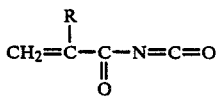

wherein R is hydrogen or lower alkyl to obtain a polymer having an isocyanatocarbonyl content between 0.1 and 72.2% by weight, (b) a blocked alkenoyl isocyanate to obtain a polymer having a blocked isocyanatocarbonyl content of 0.1% to 99.9% by weight, and removing blocking groups from the resulting intermediate, or (c) an alkenoyloxazolinedione hydrohalide of the formula

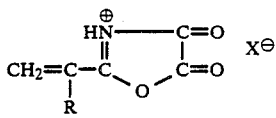

wherein R is hydrogen or lower alkyl to obtain a polymer having an oxazolinedione hydrohalide content of 0.1% to 83.3% by weight, and decomposing the resulting intermediate.

9. The curable composition of claim 1 wherein the polymer further has at least one blocked isocyanatocarbonyl group of the formula

wherein B is a blocking group, pendent from said backbone.

10. The curable composition of claim 1 wherein the active hydrogen atom-containing compound has hydroxyl, mercapto, carboxyl, amino, imino, or active methylene groups.

11. A polymer comprising a carbon-carbon backbone and pendent groups therefrom, wherein the pendant groups are (a) isocyanatocarbonyl groups of the formula

(b) blocked isocyanatocarbonyl groups of the formula

wherein B is a blocking group, or (c) oxazolinedione hydrohalide groups of the formula

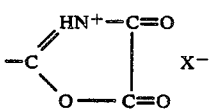

said polymer having a molecular weight between 1,000 and 100,000.

12. The polymer of claim 11 wherein the pendent groups are the blocked isocyanatocarbonyl groups and the blocked isocyanatocarbonyl content is between 0.1% and 99.9% by weight.

13. The polymer of claim 11 wherein the pendent groups are the oxazolinedione hydrohalide groups and the oxazolinedione hydrohalide content is between 0.1% an 83.3% by weight.

14. The polymer of claim 11 wherein the pendent groups are the isocyanatocarbonyl groups.

15. The polymer of claim 14 further having units derived from a polymerizable monomer having no active hydrogen atom.

16. The polymer of claim 15 wherein the polymerizable monomer is a monoolefinic hydrocarbon, alkyl alkenoate, isocyanatoalkyl alkenoate, or a mixture thereof.

17. The polymer of claim 15 wherein the polymerizable monomer is a mixture of methyl methacrylate and ethyl acrylate.

18. The polymer of claim 15 wherein the polymerizable monomer is an alkyl alkenoate.

19. The polymer of claim 15 wherein the polymerizable monomer is a mixture of methyl methacrylate and butyl acrylate.

20. The polymer of claim 14 further comprising at least one blocked isocyanatocarbonyl group of the formula

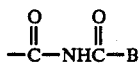

wherein B is a blocking group, pendent from said backbone.

21. The polymer of claim 20 wherein the blocking group is the residue of an alcohol, monofunctional polyethylene or polypropylene oxide, oxime, lactam, imidazole, triazole, phenolic compound, active methylene compound, N-hydroxyimide, or amine.

22. The polymer of claim 20 wherein the blocking group is the residue of 2,6-di-t-butyl-p-cresol.

23. The polymer of claim 14 further having at least one isocyanato group bonded to the backbone.

24. The polymer of claim 23 wherein the isocyanatocarbonyl content is between 5% and 30% by weight and the isocyanato content is between 5% and 30% by weight.

25. The polymer of claim 23 having a molecular weight between 3,000 and 100,000.

26. The polymer of claim 14 obtained by polymerizing (a) an alkenoyl isocyanate of the formula

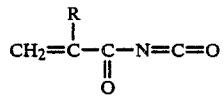

wherein R is hydrogen or lower alkyl to obtain a polymer having an isocyanatocarbonyl content between 0.1 and 72.2% by weight, (b) a blocked alkenoyl isocyanate to obtain a polymer having a blocked isocyanatocarbonyl content of 0.1% to 99.9% by weight, and removing blocking groups from the resulting intermediate, or (c) an alkenoyloxazolinedione hydrohalide of the formula

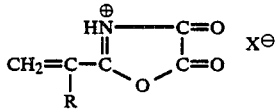

wherein R is hydrogen or lower alkyl to obtain a polymer having an oxazolinedione hydrohalide content of 0.1% to 83.3% by weight, and decomposing the resulting intermediate.

27. The polymer of claim 26 obtained by polymerizing the alkenoyl isocyanate.

28. The polymer of claim 27 wherein the alkenoyl isocyanate is methacryloyl isocyanate.

29. The polymer of claim 27 wherein the alkenoyl isocyanate is polymerized in the presence of a polymerizable monomer having no active hydrogen atom.

30. The polymer of claim 29 wherein the polymerizable monomer is a monoolefinic hydrocarbon, alkyl alkenoate, isocyanatoalkyl alkenoate, or a mixture thereof.

31. The polymer of claim 29 wherein the polymerizable monomer is a mixture of methyl methacrylate and ethyl acrylate.

32. The polymer of claim 29 wherein the polymerizable monomer is an alkyl alkenoate.

33. The polymer of claim 29 wherein the polymerizable monomer is a mixture of methyl methacrylate and butyl acrylate.

34. A process for preparing an isocyanatocarbonyl group-containing polymer comprising polymerizing (a) an alkenoyl isocyanate of the formula

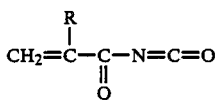

wherein R is hydrogen or lower alkyl to obtain a polymer having an isocyanatocarbonyl content between 0.1 and 72.2% by weight, (b) a blocked alkenoyl isocyanate to obtain a polymer having a blocked isocyanatocarbonyl content of 0.1% to 99.9% by weight, and removing blocking groups from the resulting intermediate, or (c) an alkenoyloxazolinedione hydrohalide of the formula

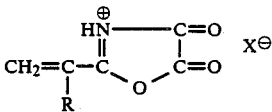

wherein R is hydrogen or lower alkyl to obtan a polymer having an oxazolinedione hydrohalide content of 0.1% to 83.3% by weight, and decomposing the resulting intermediate.

35. The process according to claim 34 polymerizing the alkenoyl isocyanate.

36. The process of claim 35 wherein the alkenoyl isocyanate is polymerized in the presence of a polymerizable monomer having no active hydrogen atom.

37. The process of claim 35 wherein the alkenoyl isocyanate is methacryloyl isocyanate.

* * * * *